United States Patent Office 3,425,855
Patented Feb. 4, 1969

3,425,855
COATED TITANIUM DIOXIDE PIGMENT
Jelks Barksdale, Auburn, Ala., and William P. Coker, Lake Jackson, Tex., assignors to The Dow Chemical Company, Midland, Mich., a corporation of Delaware
No Drawing. Filed Mar. 17, 1966, Ser. No. 535,003
U.S. Cl. 106—300  4 Claims
Int. Cl. C09c 1/36

This invention relates to titanium dioxide pigments and more particularly is concerned with an improved coated titanium dioxide pigment particularly suited for use in organic based paints and enamels.

It is a principal object of the present invention to provide a novel coated titanium dioxide pigment particularly suitable for use in organic based paints and enamels.

It is another object of the present invention to provide a coated titanium dioxide pigment which exhibits an excellent dispersion in water emulsions (latex paints) and which also has lower water absorption than the uncoated titanium dioxide material thus to provide paints of a lower viscosity.

It is also an object of the present invention to provide a novel coating for titanium dioxide pigments and a process of its application.

It is a further object of the present invention to provide a novel coated titanium dioxide pigment which shows low absorption and good dispersibility both in aqueous and organic media, high gloss and high opacity in oils and other organic vehicles employed in paints and enamels and which particularly is suitable for use as a pigment in alkyd resin enamels.

It is also an object of the present invention to provide a coating for pigment grade titanium dioxide which is inexpensive, highly effective and easily and economically applied to the pigment.

These and other objects and advantages readily will become apparent from the detailed description presented hereinafter.

The composition of the present invention comprises a pigment grade titanium dioxide coated with from about 0.1 to about 2 weight percent, preferably from about 0.2 to about 1 weight percent, of a polyethylenimine based material.

More particularly, the present invention comprises a finely divided rutile titanium dioxide pigment coated, within the disclosed range, with polyethylenimine or a polyethylenimine modified with acrylonitrile, ethylene oxide, propylene oxide or acrylamide.

Polyethylenimines ranging from low molecular weight (e.g., 600–1200) to high molecular weight (100,000 or higher) compositions and such polyethylenimines modified by reaction with from 10 to about 150 percent by weight (per weight of the polyethylenimine) of acrylonitrile, ethylene oxide, propylene oxide or acrylamide can be used in the practice of the present invention. Ordinarily these polyethylenimine based materials are provided in an aqueous solution ranging in concentration from about 15 to about 40 weight percent of the polyethylenimine component and this solution further diluted with water prior to use in the pigment coating application.

Usually in preparing the polyethylenimine or modified polyethylenimine coated titanium dioxide composition of the present invention, a predetermined amount of the polyethylenimine, as a dilute aqueous solution, is admixed with the pigment to provide a fluid, plastic mass which is thoroughly blended as by stirring. This blend is dried and any agglomerates of the resulting coated titanium dioxide particles are broken up.

In a preferred embodiment of the present invention, a rutile titanium dioxide which, as produced, is in a novel acicular form and which exhibits an excellent tinting strength and high hiding power is coated with the polyethylenimine based coating component.

This novel titanium dioxide, as produced, is in the form of substantially uniform, needle-like elongated particles having a cross-section diameter of from about 0.05 to about 0.2 micron, a length of from about 0.3 to about 1.5 microns and a length to diameter ratio of from about 3 to about 15. This particulate product is prepared by adding a "seed" of a colloidal suspension of titanium dioxide in an aqueous medium to an aqueous "master solution" having a minimum chloride/titanium ratio (on a gram mole basis) of about 4 and the resulting mixture hydrolyzed, preferably at an elevated temperature, to precipitate the acicular titanium dioxide product which is separated from the reaction mass.

In actual preparation of the acicular titanium dioxide, the titanium dioxide nucleating reactant, i.e., "seed," is prepared from an aqueous titanium chloride solution having a chloride/titanium gram-mole ratio of from about 1.5 to about 4, preferably from about 1.6 to about 2.3, a pH of from about 0.3 to about 0.7 and a titanium concentration (expressed as Ti) of from about 8 to about 30 grams per liter, preferably from about 8 to about 15 grams per liter. (The term "titanium" as used herein means titianium in an oxidized state and not the elemental metallic state.) The solution is heated at a temperature of from about 60 to about 90° C. for a period of from about 4 to about 60 minutes and preferably at a temperature of from about 75 to about 85° C. for about 15 to about 30 minutes whereupon a bluish-colored opalescent colloidal suspension of titanium dioxide particles having a diameter of from about 0.002 to about 0.010 micron precipitates therein.

A quantity of the seed material sufficient to supply a titanium concentration of from about 4 to 10 weight percent and preferably from about 5 to about 7 percent by weight of the titanium values in the final reaction mixture is added to a master solution having a minimum chloride/titanium ratio, based on gram-mole equivalents, of 4 and preferably greater than 4, a hydrogen ($H^+$)/titanium ratio of at least 4 and a titanium concentration (expressed as Ti) of from about 15 to about 85 grams per liter and preferably from about 30 to about 45 grams per liter.

The resulting reaction mixture contains from about 10 to about 60 grams of titanium per liter, and preferably from about 20 to about 40 grams per liter. The chloride concentration can vary from about 6 to about 10 molar, depending on the hydrolysis temperature employed. The preferred chloride concentration is about 7 g. ions/l. at 150° C., about 8 g. ions/l. at 200° C. and about 9 g. ions/l. at 260° C.

The mixture is heated to hydrolyze the titanium chloride present therein and to precipitate the titanium values as titanium oxide having a rutile crystal structure.

Following precipitation of the titanium oxide product by the hydrolysis reaction, this material ordinarily is separated from the reaction mixture, as by filtration or centrifugation, and washed.

Satisfactory hydrolysis of the titanium chloride results by heating the reactant mixture at about 100° and 1 atmosphere pressure, for example. It has been found if the hydrolysis reaction is carried out in sealed reactors at higher temperatures, i.e., above about 190° C., and preferably at from about 210 to about 260° C. and autogenous pressures the resulting precipitated titanium oxide product without subsequent calcination exhibits an unusually high tinting strength.

If desired, however, the precipitated product resulting from the high temperature hydrolysis can be calcined at a temperature of about 700° to about 900° C. for a period of time of from about 0.5 to about 6 hours and preferably from about 800° to about 850° C. for about one hour to further increase the tinting strength although even in the uncalcinated state it is to be understood these products are suitable for use as pigments.

The seed and titanium chloride solution used for preparing the present novel product can be made from a variety of source materials. To illustrate: $TiCl_4$ obtained by direct chlorination of titanium containing materials can be introduced into water and the pH of the solution adjusted by additions of base such as caustic, (NaOH) or (KOH), or ammonia.

Conveniently, however, the substantially iron-free $TiCl_4$ leach liquor solution resulting from the dissolution of a titaniferous material by hydrochloric acid with subsequent solvent extraction for iron removal as set forth in U.S. Patent 3,104,950 is employed. The acidic titanium chloride raffinate obtained in this process not only is an excellent high-purity titanium chloride master solution, but also provides a desirable source solution for seed preparation as well.

The resulting acicular titanium dioxide product as produced can be coated directly to produce the composition of the present invention with or without additional grinding. Alternatively it can be coated with one or more materials such as, for example, alumina ($Al_2O_3$), phosphorus pentoxide ($P_2O_5$), silica ($SiO_2$), etc., as commonly is practiced in the art, prior to preparing the novel composition of the present invention.

The following examples will serve further to illustrate the present invention, but are not meant to limit it thereto.

Example 1

A titanium containing "seed" solution was prepared from an acidic titanium chloride raffinate solution resulting from the hydrochloric acid leaching of an Ione ilmenite ore wherein impurity values, such as iron, were removed by solvent extraction with tributyl phosphate. This seed solution was adjusted to have a Cl/Ti mole ratio of about 1.7 and a pH of about 0.5. The titanium concentration in the solution was about 15 grams/liter. Simmering of the seed solution at about 85° C. for about 7 minutes precipitated about 83 percent of the titanium as substantially uniform nuclei of titanium oxides having diameters of from about 0.002 to about 0.010 micron. The resulting collodial suspension was blue in color, turbid and exhibited an opalescense.

About 1 volume of the aqueous acidic collodial seed product mixture was added to 5 volumes of a substantially iron-free aqueous acidic chloride leach liquor containing about 44 grams titanium per liter and being about 8.2 molar in chloride ion.

The resulting mixture was heated at about 150° C. for about 2 hours during which time an acicular titanium dioxide having a cross-section diameter of about 0.1 micron and a length of about 0.8 micron precipitated in the reaction mass. This product was separated from the reaction mass and washed with water.

Following the washing the acicular hydrous titanium dioxide precipitate was treated with 0.1 weight percent $P_2O_5$ (as orthophosphoric acid) and 3 weight percent $Al_2O_3$ (as aluminum chloride), the so-treated product neutralized with ammonium hydroxide and the so-coated titanium dioxide calcined at about 850° C. for 1 hour. The calcined product then was milled in a fluid energy mill.

Samples (~500 grams) of this base titanium dioxide pigment material were thoroughly mixed by stirring in dilute solutions of polyethylenimine or a modified polyethylenimine. The resulting suspensions were concentrated by drying first at room temperature followed by a final drying in an oven at about 110° C. to evaporate the water and leave the polyethylenimine component as a coating on the pigment particle. The particles of the so-dried polyethylenimine coated pigment which had become somewhat agglomerated during the coating operation were separated by short term milling in a fluid energy mill. This latter operation was found to have no detrimental effect on the coating present on the titanium dioxide.

Water absorption of the coated pigment was determined. In this test, a measured quantity of water was added dropwise to 100 grams of the pigment while mixing the system on a glass plate. The water addition was continued until the "thin point" was reached. "Thin point" as is understood by one skilled in the art is the first discernible point where the pigment-liquid system becomes fluid and "runs." The water absorption of the pigment thus is the total amount of water added to reach the "thin point."

The water absorption of a number of polyethylenimine coated titanium dioxide pigments are summarized in Table I.

TABLE I

| Run No. | Polyethylenimine coating (type) | Percent by weight [1] | Water absorption gms. of $H_2O$/100 gms. pigment |
|---|---|---|---|
| Control | Base pigment—no polyethylenimine coating. | | 250 |
| 1 | Polyethylenimine (~40,000–60,000 mol. wt.). | 1 | 65 |
| 2 | Polyethylenimine (~100,000 mol. wt.). | 1 | 63 |
| 3 | Polyethylenimine-ethylene oxide (~100,000 mol. wt.).[2] | 1 | 59 |
| 4 | Polyethylenimine-acrylonitrile (~75,000 mol wt.).[3] | 1 | 61 |

[1] Based on wt. of $TiO_2$.
[2] Reaction product of polyethylenimine (1 part by weight) and ethylene oxide (1 part by weight).
[3] Reaction product of polyethylenimine (1 part by weight) and acrylonitrile (0.15 part by weight).

Dispersion of the pigment in water was determined by placing 3 grams of the pigment from the end of a spatula onto the surface of 100 milliliters of water in a 100 milliliter graduated cylinder. The rate of settling and dispersion of the pigment to the bottom of the cylinder was noted visually and a value rating from "poor" to "very good" then given. A "poor" rating indicated rapid settling of the pigment to the bottom of the cylinder with little or no dispersion. "Very good" indicated substantially all of the pigment particles dispersed in the water to form a white cloud throughout the cylinder before reaching the bottom of the column of water.

The results of a number of studies carried out with a variety of polyethylenimine coated titanium dioxide samples are summarized in Table II.

TABLE II

| Run No. | Polyethylenimine coating (type) | Percent by weight [1] | Dispersion rating |
|---|---|---|---|
| Control | (Base pigment—no polyethylenimine coating). | | Poor. |
| 1 | Polyethylenimine (~40,000 to 60,000 mol. wt.). | 1 | Very good. |
| 2 | do | 2 | Do. |
| 3 | do | 0.5 | Do. |
| 4 | Polyethylenimine (~100,000 mol. wt.). | 1 | Do. |
| 5 | do | 2 | Do. |
| 6 | do | 0.5 | Do. |
| 7 | Polyethylenimine-ethylene oxide (~100,000 mol. wt.).[2] | 1 | Do. |
| 8 | do | 2 | Do. |
| 9 | do | 0.5 | Do. |
| 10 | Polyethylenimine-acrylonitrile (~75,000 mol. wt.).[3] | 1 | Do. |
| 11 | do | 2 | Do. |
| 12 | Polyethylenimine-acrylamide (~75,000 mol. wt.)[4] | 1 | Fair. |
| 13 | Polyethylenimine-propylene oxide (~85,000 mol. wt.).[5] | 1 | Do. |

[1] Based on weight of titanium dioxide.
[2] Reaction product of polyethylenimine (1 part by wt.) and ethylene oxide (1 part by wt.).
[3] Reaction product of polyethylenimine (1 part by wt.) and acrylonitrile (0.15 part by wt.).
[4] Reaction product of polyethylenimine (1 part by wt.) and acrylamide (0.15 part by wt.).
[5] Reaction product of polyethylenimine (1 part by wt.) and propylene oxide (0.3 part by wt.).

Example 2

A number of enamels were prepared by adding 4 grams of a polyethylenimine coated pigment to 60 grams of a conventional alkyd resin vehicle (60% solids) in a one-half pint can. The pigment was incorporated into the vehicle by stirring with a spatula followed by mixing with a 2-inch Cowles blade at 2500 revolutions per minute for 20 minutes. "Drawdowns" were made on clear plastic and black and white contrast sheets from each of the enamels so-produced using a 2 mil blade following the standard test technique. As controls, an enamel having a non-polyethylenimine coated pigment prepared as set forth in Example 1 and an enamel prepared using a commercially available titanium dioxide pigment were similarly prepared and coated onto the test panels.

After drying in air, each enamel film was examined for degree of dispersion, gloss and opacity relative one to another and to the reference (control) films.

In all cases, the enamels prepared with polyethylenimine coated pigment showed markedly better dispersion, gloss and opacity than the reference enamel prepared using the base titanium dioxide pigment.

When compared with the reference enamel containing the commercial titanium dioxide pigment, substantially all of the enamels prepared using the coated pigment of the present invention were found to exhibit a better pigment dispersion. Further, the gloss and opacity of these enamels compared favorably with that of the commercial titanium dioxide pigmented reference enamel.

Table III summarizes the polyethylenimine materials used to coat the titanium dioxide pigment and the coating concentration employed for each of pigments used in the enamels tested.

TABLE III

| Run No. | Polyethylenimine Component | Coating weight percent based on TiO$_2$ |
|---|---|---|
| 1 | Polyethylenimine (~40,000–60,000 mol. wt.) | 0.1 |
| 2 | do | 0.4 |
| 3 | do | 0.5 |
| 4 | do | 1.0 |
| 5 | do | 2.0 |
| 6 | Polyethylenimine (~100,000 mol. wt.) | 0.1 |
| 7 | do | 0.3 |
| 8 | do | 0.5 |
| 9 | do | 1.0 |
| 10 | do | 2.0 |
| 11 | Polyethylenimine-ethylene oxide (1/1 by wt.) (~75,000 mol. wt.). | 0.2 |
| 12 | do | 0.5 |
| 13 | do | 1.0 |
| 14 | do | 2.0 |
| 15 | Polyethylenimine-acrylonitrile (1/0.15 by wt.) (~75,000 mol. wt.). | 0.2 |
| 16 | do | 1.0 |
| 17 | do | 2.0 |
| 18 | Polyethylenimine-propylene oxide (1/0.3 by wt.) (~85,000 mol. wt.). | 1.0 |

In a manner similar to that described for the foregoing examples, a commercially available pigment grade rutile titanium dioxide prepared by the conventional chloride process coated with the polyethylenimine materials set forth in the examples gives substantially the same desirable dispersibility, gloss, opacity and low water absorption when used in the preparation of paints and enamels. Additionally, rutile pigment grade titanium dioxide when coated with polyethylenimines having a molecular weight about 600, about 1200 and about 1800, a polyethylenimine-ethylene oxide reaction product having a 0.75/1.0 ratio, by weight, and a molecular weight of about 100,000, a polyethylenimine-propylene oxide reaction product having a 1/1.35 ratio, by weight or similar polyethylenimine based materials as set forth hereinbefore, provide the desired useful coated composition of the present invention.

Various modifications can be made in the present invention without departing from the spirit or scope thereof for it is understood that we limit ourselves only as defined in the appended claims.

We claim:

1. A coated rutile titanium dioxide pigment composition comprising a rutile titanium dioxide pigment having a surface coating of from about 0.1 to about 2 weight percent as based on the weight of said titanium dioxide of a polyethylenimine based material selected from the group consisting of polyethylenimine and a reaction product of a polyethylenimine with from about 10 to about 150 percent by weight based on the weight of polyethylenimine of a member selected from the group consisting of acrylonitrile, ethylene oxide, propylene oxide and acrylamide.

2. The composition as defined in claim 1 wherein the polyethylenimine based material surface coating is from about 0.2 to about 1 weight percent of the weight of said titanium dioxide.

3. The composition as defined in claim 1 wherein the rutile titanium dioxide, as prepared, is a needle-like, elongated particulate material, each of the particles having a cross-section diameter of from about 0.05 to about 0.2 micron, a length of from about 0.3 to about 1.5 microns and a length to diameter ratio of from about 3 to about 15.

4. A coated pigment as defined in claim 1 wherein the surface coating is a polyethylenimine.

References Cited

UNITED STATES PATENTS

| 3,018,186 | 1/1962 | Jenkins | 106—300 |
| 3,252,852 | 5/1966 | Lagally | 106—308 |
| 3,278,479 | 10/1966 | Ferrigno | 106—308 |

HELEN M. McCARTHY, Primary Examiner.

SAMUEL E. MOTT, Assistant Examiner.

U.S. Cl. X.R.

106—308